(12) United States Patent
Korte

(10) Patent No.: US 6,444,946 B1
(45) Date of Patent: Sep. 3, 2002

(54) METHOD AND APPARATUS FOR WELDING

(75) Inventor: Joern Korte, Huelben (DE)

(73) Assignee: bielomatik Leuze GmbH + Co. (DE)

( * ) Notice: Subject to any disclaimer, the term of this patent is extended or adjusted under 35 U.S.C. 154(b) by 0 days.

(21) Appl. No.: 09/563,042

(22) Filed: May 1, 2000

(30) Foreign Application Priority Data

Apr. 29, 1999 (DE) .......................... 199 19 191

(51) Int. Cl.⁷ .............................................. B23K 26/00
(52) U.S. Cl. ........................ 219/121.6; 219/121.63; 219/121.64; 219/121.66
(58) Field of Search ................ 219/121.6, 121.63, 219/121.64, 121.65, 121.66, 121.78, 121.82

(56) References Cited

U.S. PATENT DOCUMENTS

| | | | |
|---|---|---|---|
| 3,769,117 A | * 10/1973 | Bowen et al. ................ 156/69 |
| 3,989,778 A | * 11/1976 | Osborne ...................... 264/25 |
| 4,069,080 A | 1/1978 | Osborne |
| 4,908,493 A | * 3/1990 | Susemihl ............... 219/121.67 |
| 5,267,959 A | 12/1993 | Forman |
| 5,501,759 A | 3/1996 | Forman |
| 5,645,666 A | 7/1997 | Jones |
| 5,729,959 A | 3/1998 | Spatafora et al. |
| 5,814,784 A | * 9/1998 | Kinsman et al. ......... 219/121.6 |
| 5,893,959 A | * 4/1999 | Muellich .................. 156/272.8 |
| 6,191,379 B1 | * 2/2001 | Offer et al. ..................... 219/75 |
| 6,193,833 B1 | * 2/2001 | Gizowski et al. ........ 156/272.8 |
| 2001/0000877 A1 | 5/2001 | Gizowski et al. |
| 2001/0000894 A1 | 5/2001 | Gizowski et al. |

FOREIGN PATENT DOCUMENTS

| | | | |
|---|---|---|---|
| DE | 126824 | * 8/1977 | ........... B29C/27/02 |
| DE | 42 25 679 | 2/1994 | |
| DE | 195 10 493 | 10/1995 | |
| DE | 44 32 081 | 3/1996 | |

* cited by examiner

Primary Examiner—M. Alexandra Elve
(74) Attorney, Agent, or Firm—Akerman Senterfitt

(57) ABSTRACT

For joining two faces (41, 42) of thermoplastics in a penetration beam welding method the covered face (42) is multiply scanned and thus incrementally heated by a laser beam (10) directed through the covering face (41). This preheating is repeated until the melting temperature is attained. In the region of the covered face (42) a melt thus materializes simultaneously over the full seam length which wets the covering face (41) and thus also transfers this face into melt by heat conduction. On completion of material softening the faces (41, 42) are mutually moved until abutting. Thus the two faces (41, 42) weld in principle as if they had been plasticized simultaneously over the full seam length which significantly enhances the seal and strength of the seam, whilst the expenditure the apparatus is low.

20 Claims, 2 Drawing Sheets

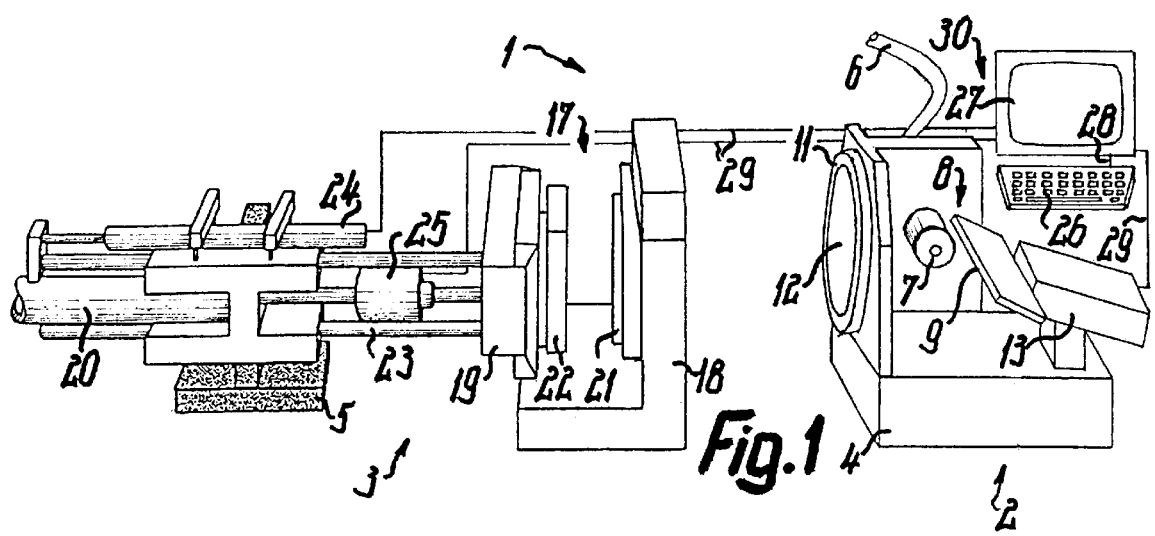
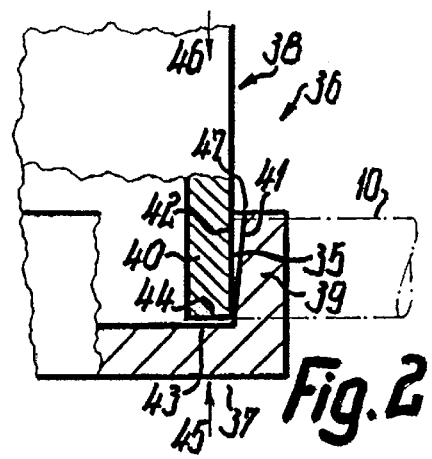
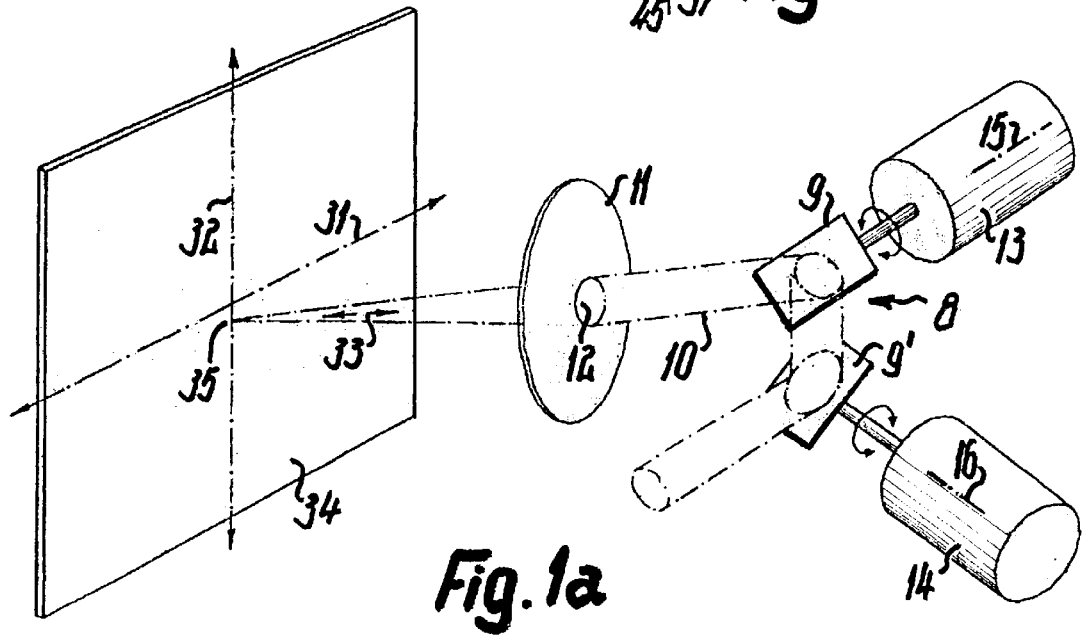

METHOD AND APPARATUS FOR WELDING

TECHNICAL FIELD AND BACKGROUND OF TEE INVENTION

The invention relates to a method and to an apparatus for welding a joint, particularly for joining thermoplastics, with a beam of energy whose wavelength may be in or near the infrared range. The short-wave radiation may be in the range of 0.7 to 2.0 μm. The two joint zones or joint faces are held coincidental or in contact with each other during plastification. In this or some other way first one joint zone is plasticized before then the other joint zone is plasticized. Thereby the second joint zone is wetted with the plasticized first joint zone and is thus likewise plasticized by heat conduction.

In butt welds both joint zones are plasticized separate from each other, but simultaneously, and then pressed against each other in the plastic state to become welded. Due to the contact pressure plasticized material may break out from the joint and then form a bead which is usually undesirable. The heating effect may also be done by vibration, namely by friction at the joint face or by friction of both joint faces. This results in abrasion particles which interfere and are difficult to eliminate from many products. In penetration beam welding, by contrast, the welding energy is applied to the coincident joint faces, for example through the exposed cross-section and its joint face onto the joint zone of the covered cross-section. As a result of this the joint zone adjoining the joint face is plasticized as a partial or flux layer of the cross-section. Thereafter the plasticized material mass moistens by flux, mutual transverse motion or contact pressure the other joint face and plasticizes also the joint zone thereof, resulting in the weld. When this weld is made along the joint or seam progressively, then field sections of the seam are already solidly welded whilst others are still plastic or in need of being plasticized. This makes homogenous contact pressure of the joint faces difficult in the various sections of the seam like also levelling of the joint faces by melting down. Melting down enables to equalize differences in tolerance of the shape and location of each joint face.

It is conceivable to beam the complete joint zone simultaneously with energy, for example by an array of diode lasers or beam focal points. This needs a complicated apparatus especially when the run of the weld is not straight. Apart from this the beam output is not suitable for workpieces differing in shape.

OBJECTS OF THE INVENTION

An object of the invention is to provide a method respectively an apparatus with which the disadvantages of known configurations or the aforementioned kind can be obviated. Another object is to make it possible to soften or maintain plasticized each of the two joint faces over the full seam length substantially simultaneously. Thus in this state the two cross-sections or components to be joined should still be mutually positionable into that predetermined orientation in which they are to be finally joined by the solid weld. A further object is to achieve a seam which remains sealed and has tensile strength even when exposed to high loads or pressures. Namely the same strength as of parts of the cross-sections adjoining the seam or spacedly juxtaposed to the seam is intended. Still another object is to make the joint with little consumption, irrespective of the seam course.

SUMMARY OF THE INVENTION

According to the invention only one or both of the joint faces is/are entirely preheated to an intermediate temperature slightly below the working or melting temperature. At the latest then the joint faces are brought into mutual contact and the entire preheated joint face is heated to the final melting temperature. The melt or melting mass then heats the other joint face simultaneously over the entire seam length and up to the melting temperature. This results in the melt mass of the two joint zones intermingling homogeneously and solidifying on cooling to a solid weld. This prevents the melts from solidifying in some seam area before both joint zones of all other seam areas have attained the melting temperature, namely are fused together. All seam areas consequent melt near to simultaneously or each seam area fuses as long as all remaining seam areas are still soft enough to allow the components to be mutually moved so that the softened material is able to yield or be displaced. The seam melt solidifies over the full length and width of the seam simultaneously or practically at the same time thus also avoiding strains to rise.

Preheating may be done in several steps or cumulative from a first intermediate temperature to a next higher intermediate temperature. For this purpose the beam focus or field is moved along the joint zone so quickly that each section of the joint zone between two sequential heatings by the beam field cannot cool down to the last initial or minimum temperature of the previous heating. For example, the heatings may be done in one, two or three seconds once, ten or more times, whereby also every whole number between one and twelve is possible. This incremental or gradual heating of the joint zone occurs whilst the joint faces are mutually urged in contact. As soon as the one joint face has become soft or plasticized simultaneously over the full length of the seam, the associated component can be moved by the contact pressure over a desired degree relative to the other component. This enables tolerance differences in the dimensions of the components or in the superficial shape of the joint faces to be equalized. This motion is limited either by stops on the components themselves or by stops on the pressing/gripping device with which fixture the components are held or pressed together during production of the joint.

During preheating and/or melting the energy beam penetrates the one joint face, which it does not heat or only slightly so due to its physical properties. The beam impinges the joint face directly juxtaposed which due to its physical properties absorbs the radiation in heating up until it enters into the melting phase which heats the first joint face likewise up to plastification. Thus even long welds can be produced in less than 15, 10 or 5 seconds including preheating. The method is particularly suitable for plastics or for circumferentially continous seams as used in joining container components. It is also suitable for other purposes, e.g. for complementary preadaptation of joint faces where these need to be non-distructively separable.

The method is implementable with known apparatuses, namely with a writing or scanner head having a beam output for an energy beam such that the beam can also be deflected continuously in differing directions with the head stationary. However, the beam output may also be secured to a robotic arm to be thereby moved articulatedly and powered in all three dimensional directions so that the beam is moved along the seam by the beam output which is held at a constant spacing from the seam. According to the invention the apparatus has control means which guide the beam field multiply in sequence over each of the sections of the joint zone or seam, particularly in timed intervals of maximally one to six or four seconds. The beam output may be formed by a mirror or a focussing lens. Where for beam steering two sequential mirrors are used, each is swivable about a separate axis independently of the other. Thus the beam can be moved simultaneously in two spatial axes which are mutually perpendicular. With the focussing optics or a Z-axis module the beam field can also be powered in the third spatial axis whilst maintaining its field area constant. Thus varying distances between beam output and joint zone are compensated.

BRIEF DESCRIPTION OF THE DRAWINGS

Example embodiments of the invention are explained in more detail in the following and illustrated in the drawings in which:

FIG. 1 is a simplified illustration in perspective of an apparatus according to the invention;

FIG. 1a is an illustration on a magnified scale of a detail shown in FIG. 1, and FIGS. 2 to 6 are illustrations of various example embodiments of joint configurations. showing their joint faces and cross-sections.

DETAILED DESCRIPTION

Figure 3:
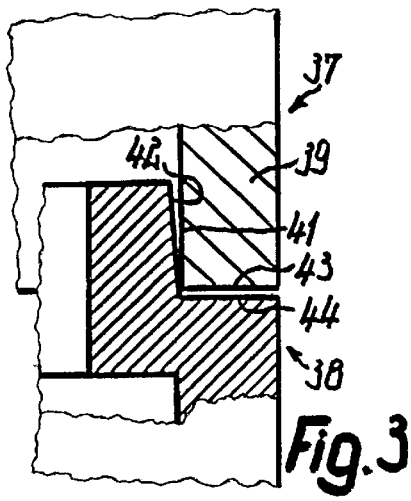

FIG. 1 illustrates apparatus 1 including scanner head 2 with base 4 and means 3 for stationarily holding the workpiece to be worked. Stationary base 5 of fixture 3 is fixedly connected to base 4. Each of units 2, 3 is exchangeably mounted on a base frame independently of the other.

Head 2 includes beam guiding means comprising a light mains 6, with output 7, means 8 for steering beam 10, one two or more mirrors 9, objective lens 11, beam output 12 and a motor 13 or 14 as advancing means for powering each mirror 9 arranged on base 4. Lightguide 6, for instance a glass-fiber optic cable, guides the polarized laser light from a light source to intermediate output 7 from which beam 10 impinges directly on mirror 9 directly guiding beam 10 through lens 11. Mirror 9 or lens 11 forms beam output 12 from which beam 10 is directed over a free distance directly onto the working zone of the workpiece. Motor 13 carries mirror 9 on a shaft so that the pivot axis 15 or 16 is located in the plane of this mirror and at an angle to the center axis of output 12. Mirror 9 can also be pivoted about two mutually perpenticularr axes, its pivoting angle being e.g. 20° to 30°. FIG. 1a illustrates a further mirror 9' having a separate motor 14 and located upstream of mirror 9. Pivot axis 16 of mirror 9' is angular with axis 15 of mirror 9 and with the axis of lens 11.

Unit 3 has a device or gripping fixture 17 with two opposite jaws or cheeks 18, 19 for tensioning the components to be joined against each other. Jaw 18 is fixedly connected to brackets 4, 5. Jaw 19 is movable relative to jaw 18 with an actuator 20, such as a pneumatic cylinder. Exchangeably secured to each jaw 18 and 19 is a tensioning jaw 21 and 22 adapted to the corresponding workpiece and in direct contact therewith for secure clamping. Jaw 19 is reversingly mounted on base 5 by guide 23. A sensor or reveiver 24 continuously senses the travel of jaw 19 relative to jaw 18. The force which stresses jaw 19 against jaw 18 or workpiece is continuously sensed by a receiver 25.

Control means 30 for actuating steering means 8 and for controlling characteristics like the check path or travel and the check force comprise means 26 for entering the corresponding data to which an electronic data storage with the corresponding programs for differing workpieces is assiged. Via the input or keyboard 26 these programs can also be entered, altered and retrieved so that means 3, 8 are sequenced as provided for. The data may be displayed on monitor 27 which is connected to input 26 via a signal cable 28 and to means 13, 24, 25 as well as to actuator 20 via separate signal and control leads 29.

FIG. 1a illustrates a flat working zone 34, representative for a workpiece, in the plane of which two spatial axes 31, 32 at right angles to each other are shown. A third spatial axis perpendicular to axes 31, 32 is perpenticular to working zone 34. Means 8 continously move beam 10 over the zone 34 by superimposing the beams motions which are oriented parallel to axes 31, 32. Zone 34 is impinged by beam 10 with beam field 35, the size of which is varied by optics 11 or its distance between output 12 and zone 34. When zone 34 is moved nearer to output 12 the beam field 35 becomes larger and vice-versa. If zone 34 extends not only in one plane but also in direction 33, field 35 is maintained constant in size while moving over the entire zone 34.

FIG. 2 illustrates workpiece 36 comprising two components 37, 38 which are here a container 38 closed off by a cover 37, made from thermoplastics. The cross-sections 39, 40, namely annular rim 39 and container shell 40 have to be annularly or continuously sealingly welded to each other at annular joint faces 41, 42. For assembly part 37 is put on part 38 in direction 45 or opposite to direction 46. Parts 37, 38 are mutually clamped in direction 45, 46 by means 17. The spacing between faces 41, 42 then increases slightly in direction 45, for example by a few angular degrees. The leading end of part 38 or of cross-section 40 respectively as related to direction 46 forms a cross face 44 oriented transverse or perpendicular to faces 41, 42 and adjoins face 42 at an acute angle. A corresponding face 43 adjoins likewise face 41 and with a spacing opposes face 44 as an abutment. Thus the sharp transition edge of faces 42, 44 contacts the inclined face 41 with tension and by this spacing from face 43. The spacing between end 47 of face 41 remote from face 43 and face 43 defines the width of the weld seam, the length extension of which is perpendicular to the drawing plane. The centrally symmetrical beam field 35 has a width or diameter equalling this seam width and is thus multiply smaller than the seam length.

Cross-section 39 is permeable to beam 10 without any substantial energy absorption, i.e. transparent to beam 10. Relative thereto cross-section 40 absorbs the energy of beam 10 considerably more in the vicinity of face 35 and is thus heated by beam 10. This may be achieved by incorporating additives or absorption substances such as pigments, carbon black, talcum or the like.

Means 8 guide beam 10 totally through cross-section 39, the size of field 35 on face 42 always being kept constant. Beam 10 is simultaneously so deflected by means 8 that beam field 35 travels in a sole direction at high speed continually over area 42 along the full length of the seam. This results in the temperature of cross-section 40 increasing continuously around the joint zone 42 from room or first initial temperature, namely from one intermediate temperature to the next higher intermediate temperature whilst cross-section 39 in the region of joint zone 41 is initially not heated or much less at the most. Between two passes in which beam field 35 falls sequentially on the seam portion as shown in FIG. 3, the joint zone 42 cools only unsubstantially or not at all.

After a plurality of more than five or ten passes the temperature of the joint zone 42 has increased to the melting temperature and the melt or flux layer expands over the seam width up to contact with face 41. This results in the heat of joint zone 42 being directed through face 41 into cross-section 39. Thus joint zone 41 likewise attains melting temperature simultaneously over the full length of the seam to provide a further flux layer on face 41. Previously, or simultaneously, parts 37, 38 move mutually due to clamping force 45, 46 until the non-plasticized faces 43, 44 about mutually. Control means 30 then prevent any further positioning travel by controlling actuator 20. The weld melt does not "weep" from the gap between zones 41, 42. Instead the melt is drawn into this gap so that no seam bead forms at end 47. Initially the gap spacing between faces 43, 44 corresponds to the mean gap width between faces 41, 42. This gap width is less than one or half a millimeter. Rim 39 surrounds the outer circumference of container shell 40 so that penetration beam welding may be done from the outside of the container. Once the gap has been filled the melt cools and the seam becomes solid and sealed throughout. After this, workpiece 36 is released and removed from means 17.

As evident from FIG. 2 face 42 is oriented parallel to directions 45, 46 and face 41 is at an angle thereto.

FIG. 3 illustrates how inversely face 41 is parallel to clamping direction 45, 46 and face 42 is at an angle of less than 2° or 3° thereto. Face 43 is an annular end face of wall 39 and not, as shown in FIG. 2, a recessed face. Face 44 is a shoulder face set back relative to the free end of face 42 so that the gap between faces 43, 44 is exposed to the outside of the workpiece. There is likewise no expulsion of melt from between faces 43, 44 since melt is prevented from entering this gap.

Figure 4:
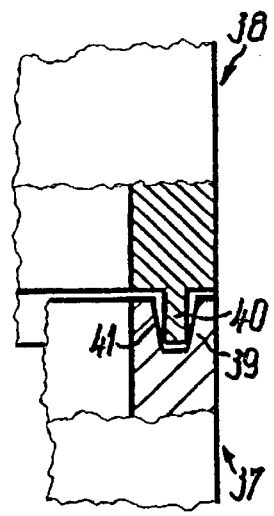

FIG. 4 illustrates cross-section 40 as an annular web. This web freely protrudes cross-sectionally beyond the thicker associated wall of part 38 so that each of its flanks adjoins a shoulder face of this wall. These shoulder faces form faces 43, 44. Both web flanks may be joint faces 42 to be welded with joint faces 41 of part 37. These joint faces 41 are formed by flanks of a groove in cross-section 39. The groove flanks converge at an acute angle to the groove bottom. The latter and the longitudinal edge of web 40 too may form the abutting faces. Cross-section 40 is sufficiently thin for being entirely transferred into melt until this fully fills the groove and welds both web flanks to the two groove flanks.

Figure 5:
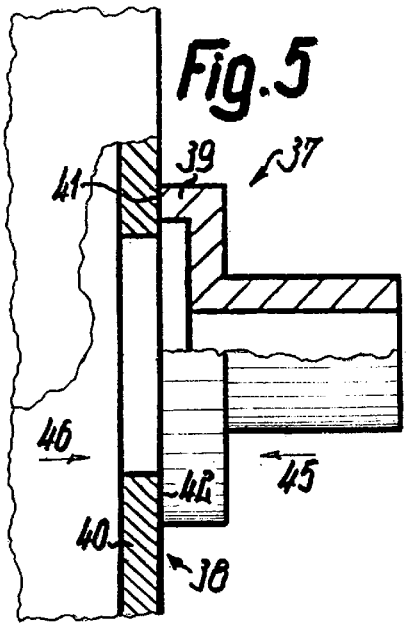

FIG. 5 illustrates cross-section 40 as a container wall and the outer face thereof is the joint face 42. Cross-section 39 is a web or a sleeve, the longitudinal or end face of which forms joint face 41. Web 39 is the freely protruding rim of a nipple 37 whose trough duct is to be connected to an opening in the container wall so that the seam sealingly surrounds this opening. Beam 30 is here directed through rim 39 parallel to the axis thereof, namely also through that end wall of nipple 37 which adjoines rim 39. This end wall is spaced from face 42. Parts 37, 38 are mutually clamped in directions 45, 46 perpendicularly or transversely to faces 41, 42. Simultaneously with plasticizing, parts 37, 38 are mutually approached in directions 45, 46 until control means 30, 24 limit this travel.

Figure 6:
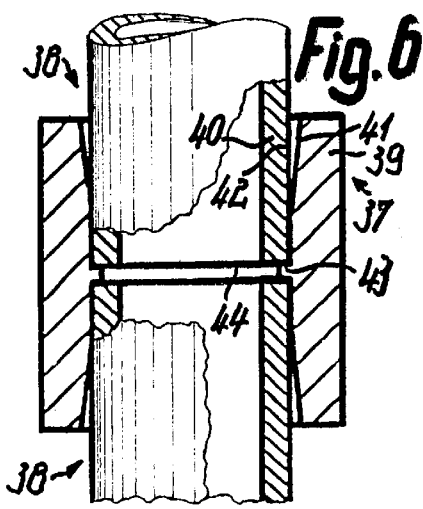

FIG. 6 illustrates how two parts or tubes 38 are mutually longitudinally or coaxially positioned and joined to part 37. Tubes 38 are inserted from opposite directions into sleeve 37 prior to plastication and abut by their ends 44 against mutually remote faces 43. Faces 43 are formed by a collar protruding beyond the inner circumference of part 37. Joint faces 41, 42 are spaced from faces 44. Tubes 38 are not moved forward each other parallel to faces 41, 42 during welding. Instead the melt is able to flow without tension from joint zone 42 to joint zone 41. Faces 41, 42 may, however, also be moved transverse to each other e.g, by radially stressing cross-section 39 against cross-section 40.

Instead of a single beam 10 several beams 10 may be provided simultaneously so that their beam fields 35 are distributed over the full length of the seam. These beam fields are interspaced and scan along the seam at the same speed or differing speeds. Thus the welding energy can also be entered even quicker into cross-sections 39, 40 so that each zonal section of face 42 heated by field 35 cools even less until it is reheated by the next pass.

It will be appreciated that the cited features and effects may be precisely as described, or merely substantially or approximately so and may also greatly deviate therefrom, depending on the particular requirements.

What is claimed is:

1. A method of laser welding a joint, wherein the joint defines a joint field between a first joint face and a second joint face, wherein the first and second joint faces bound first and second cross-sections and have an initial temperature, wherein the first and second cross-sections comprise weldable materials of different physical characteristics such that the material of the first cross-section is substantially transparent to a laser beam, and the material of the second cross-section absorbs the laser beam, wherein the joint field includes field sections, said method comprising:

directing a laser beam through the first cross-section and the first joint face to the second joint face on which the laser beam impinges, whereby the second joint face is heated within a beam field smaller than the joint field;

moving the beam field in a sweeping action repeatedly over the joint field, wherein, during each sweeping action, only a portion of the total heating energy needed to attain a welding temperature is transmitted to each field section; and pressing the first and second joint faces together during at least a portion of the sweeping action;

whereby the second cross-section and second joint face are incrementally heated and plasticized by the repeated sweeping action of the beam field, and the first cross-section and first joint face are heated indirectly by heat transmitted from the second cross-section to the first cross-section; and whereby the temperature is raised from the initial temperature to the welding temperature in the first and second cross-sections substantially simultaneously over the whole joint field.

2. The method according to claim 1, wherein each of the field sections is swept by said beam field more than once in three seconds.

3. The method according to claim 1, wherein said joint field has a shape of an annular rim and said beam field is continuously guided to repeatedly move along the rim of the joint field, whereby the entire joint field is heated.

4. The method according to claim 1, wherein the first and second cross-sections are pressed against each other just before the first and second joint faces attain the welding temperature.

5. The method according to claim 4, wherein the first and second cross-sections are pressed against each other when the heating of the joint field begins.

6. The method according to claim 5, wherein the first and second cross-sections are pressed against each other uninterruptedly until the first and second joint faces weld together.

7. The method according to claim 1, wherein while being heated the first joint face is held at an acute angle relative to the second joint face.

8. The method according to claim 1, wherein while being heated the first and second cross-sections are pressed against each other transverse to a direction of said sweeping action.

9. The method according to claim 1, wherein each of the field sections is swept by said beam field between at least once and at least ten times per second.

10. The method according to claim 1, wherein said laser beam is reflected on a mirror for performing said sweeping action.

11. The method according to claim 10, wherein said mirror is automatically displaced by a robot including a leverage arm and motor means displacing said mirror with the leverage arm.

12. An apparatus for welding a workpiece, wherein the workpiece includes a joint defining a joint field between a first joint face and a second joint face, wherein the first and second joint faces bound first and second cross-sections, wherein the joint field includes field sections, wherein the first and second cross-sections comprise weldable materials of different physical characteristics, wherein the material of the first cross-section is substantially transparent to a laser beam, and the material of the second cross-section is absorbent of the laser beam and is heated thereby, said apparatus comprising:

means for creating the laser beam;

means for guiding the laser beam, said guiding means including a beam output directed to pass the laser beam through the first cross-section onto the second joint face, thereby projecting a beam field of the beam onto the second joint face;

means for advancing the beam field along the second joint face;

control means for controlling said advancing means, wherein said control means guides the beam field repeatedly and sequentially over each of the field sections while the laser beam penetrates the first cross-section; and a gripping fixture holding the workpiece and pressing the first and second cross-sections with their joint faces together during heating by the laser beam.

13. The apparatus according to claim 12, wherein said control means guides the beam field over each of the field sections repeatedly in time intervals of no more than two to three seconds.

14. The apparatus according to claim 12, wherein motor means are included for positionally driving the beam field.

15. The apparatus according to claim 12, wherein said beam output has a mirror and a focussing objective lens.

16. The apparatus according to claim 12, wherein said beam guiding means include a first mirror and a second mirror located downstream of said first mirror, at least one of said first and second mirrors being independently rotatable about a guide axis oriented parallel to said at least one mirror.

17. The apparatus according to claim 12 and further defining components including the first and second cross-sections, wherein holding means are included, said holding means including a gripping fixture for holding the components.

18. The apparatus according to claim 17, wherein said gripping fixture includes tensioning jaws and cheeks, at least one of said cheeks being displaceable relative to the components and at least one of said cheeks exchangeably bearing at least one of said tensioning jaws.

19. The apparatus according to claim 17 and further defining gripping characteristics of said gripping fixture, wherein the gripping characteristics include a check path and a check force for gripping at least one of the components, said control means controlling at least one of the gripping characteristics.

20. The apparatus according to claim 19, wherein said gripping fixture including at least one receiver for detecting at least one of the gripping characteristics, a signal lead connecting said at least one receiver with said control means, said control means being connected via a control lead to an actuator of said gripping fixture.

* * * * *